(12) United States Patent
Sinko et al.

(10) Patent No.: US 6,217,399 B1
(45) Date of Patent: Apr. 17, 2001

(54) PROPULSION ARRANGEMENT FOR AXISYMMETRIC FLUID-BORNE VEHICLES

(75) Inventors: Michael S. Sinko, Preston; James S. Smith, Old Lyme; Pieter Van Dine, Mystic; John H. Chapman, Groton, all of CT (US)

(73) Assignee: Electric Boat Corporation, Groton, CT (US)

( * ) Notice: Subject to any disclaimer, the term of this patent is extended or adjusted under 35 U.S.C. 154(b) by 0 days.

(21) Appl. No.: 09/236,435

(22) Filed: Jan. 25, 1999

(51) Int. Cl.[7] .................................................. B63H 11/00
(52) U.S. Cl. ............................................. 440/38; 114/337
(58) Field of Search ........................ 60/221, 222; 440/6, 440/38, 46, 47, 66, 67; 114/337, 338, 20.1, 20.2

(56) References Cited

U.S. PATENT DOCUMENTS

| | | |
|---|---|---|
| 3,122,121 * | 2/1964 | Krauth ..................................... 440/66 |
| 3,182,023 | 5/1965 | Lehmann . |
| 3,194,201 * | 7/1965 | Lang ...................................... 114/20.2 |
| 3,779,199 | 12/1973 | Mayer, Jr. . |
| 5,045,004 | 9/1991 | Kim . |
| 5,078,628 | 1/1992 | Garis, Jr. . |
| 5,185,545 | 2/1993 | Veronesi et al. . |
| 5,306,183 * | 4/1994 | Holt et al. ................................ 440/6 |
| 5,333,444 | 8/1994 | Meng . |
| 5,438,947 | 8/1995 | Tam . |
| 5,574,246 | 11/1996 | Meyers et al. . |
| 5,702,273 | 12/1997 | Cho et al. . |

* cited by examiner

*Primary Examiner*—Ed Swinehart
(74) *Attorney, Agent, or Firm*—Baker Botts L.L.P.

(57) ABSTRACT

In the propulsion arrangement for an axisymmetric vehicle described in the specification, four propulsion modules are removably mounted at the rear of a vehicle in symmetric disposition about the vehicle axis, each module having an inlet section at its forward end which draws in the vehicle hull boundary layer without separation from the vehicle hull and supplies it uniformly to a rotating blade section driven by a rim drive motor. Control vanes for the vehicle are mounted between adjacent pairs of propulsion modules.

6 Claims, 1 Drawing Sheet

PROPULSION ARRANGEMENT FOR AXISYMMETRIC FLUID-BORNE VEHICLES

BACKGROUND OF THE INVENTION

This invention relates to propulsion arrangements for fluid-borne vehicles having a configuration which is generally symmetric about the vehicle axis.

Conventional propulsion systems for axisymmetric fluid-borne vehicles include internally powered, shaft-driven propeller-type drive systems and strut-mounted pod systems. Conventional propeller and shaft drive systems are susceptible to damage during shallow draft operations and damage from large ingested foreign materials. From a maintenance standpoint such conventional drive systems are cumbersome and require access from places within the vehicle, resulting in major disruption within the engine room because of the size of the components involved.

The Lehmann U.S. Pat. No. 3,182,623 discloses a jet propulsion unit for a submarine which comprises a tail section attached to the pressure hull of the submarine and having a plurality of pairs of intake ducts extending inwardly from opposite sides near the forward end of the tail section to a common central duct, each of the intake ducts having an impeller surrounded by a drive motor.

The Kim U.S. Pat. No. 5,045,004 describes a turbo-hydro duct propulsion arrangement producing a high pressure water jet to propel an underwater vehicle. The water jet has symmetrical exit nozzles. The Patent to Garis, U.S. Pat. No. 5,078,628, shows a marine propulsor for use on submarine-type vessels in which the entire propulsion system is housed outside of the hull and has an electric motor which drives a single set of blades within the housing. The Cho U.S. Pat. No. 5,702,273 describes a similar propulsion arrangement for underwater vehicles.

According to the Meng U.S. Pat. No. 5,333,444, an electromagnetic thruster for marine vehicles produces a water jet by the interaction of an intensified magnetic field and an intensified electric field. A plurality of such thrusters is symmetrically mounted around the stern of a vessel with intake openings uniformly disposed around the forward end of the periphery of the unit to cause the boundary layer passing along the surface of the vessel to be drawn into the intake. Each of the thrusters is partially embedded within a section at the stern of the vessel and control surfaces are nested around the modules so that they do not interfere with the inflow or are affected by the module outflow.

SUMMARY OF THE INVENTION

Accordingly, it is an object of the present invention to provide a propulsion arrangement for axisymmetric vehicles which overcomes disadvantages of the prior art.

Another object of the invention is to provide a propulsion arrangement for axisymmetric vehicles which is convenient to install, maintain and replace and does not require shafting through the hull of the vehicle.

These and other objects of the invention are attained by providing a plurality of propulsion modules mounted in nested fashion at the rear of the vehicle in an axially symmetric manner, each module having an internal duct leading to a rotating blade section and a housing with a contoured surface providing a fluid flow inlet along its forward edge so that the boundary layer flow from the hull of the vehicle progresses into the module inlet without separation and provides substantially uniform velocity distribution at the rotating blade section of the module. Preferably, the internal duct through which the fluid is conveyed from the inlet through the rotating blade section also has fixed vanes aft of the rotating blade section to straighten the flow of fluid. In a preferred embodiment, the rotating blade section is rim driven by an electric motor drive arrangement and the housing arrangement for the modules is provided with stabilizing or steering vanes for the vehicle.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
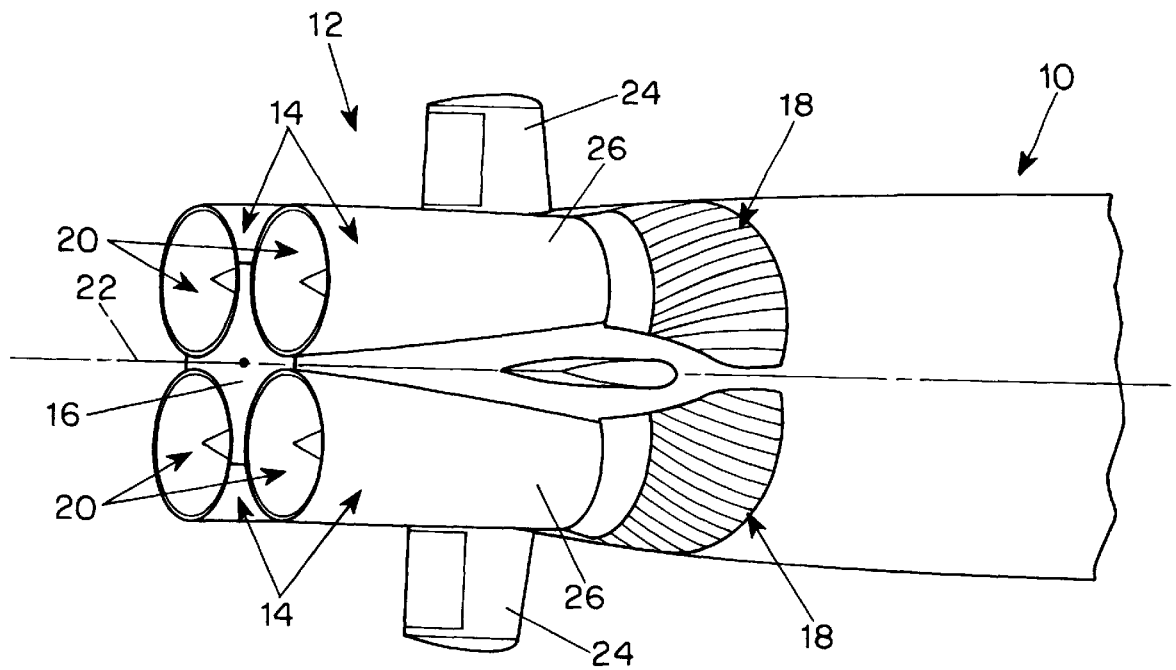
FIG. 1. is a fragmentary view showing the aft section of an axisymmetric vehicle having a propulsion arrangement in accordance with the invention.
Figure 2:
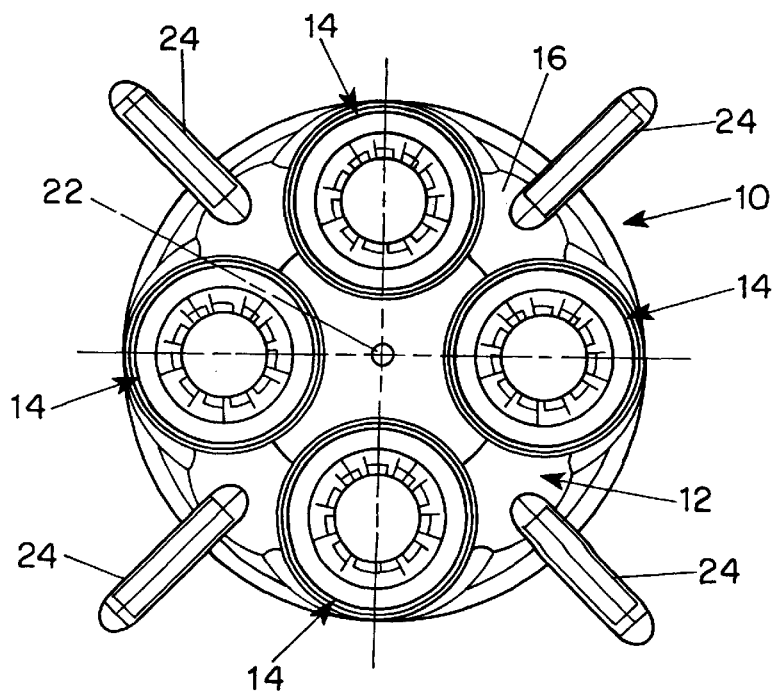
FIG. 2 is a rear view of the vehicle shown in FIG. 1.

In the typical embodiment of the invention illustrated in the drawings, an axisymmetric vehicle 10, of which only the rear portion is shown in FIG. 1, is provided with a propulsion arrangement 12 containing four propulsion modules 14 which are removably mounted in a common housing 16. Each of the modules 14 has a contoured inlet section 18 at its forward end through which the boundary layer flow from the hull of the vehicle 10 is drawn into the module without causing a separation from the hull contour in the manner described in the copending application Ser. No. 08/883,031, filed Jun. 26, 1997, the disclosure of which is incorporated by reference herein.

The inlet section 18 is screened by appropriately spaced bars or the like to prevent ingestion of foreign objects and the combined inlet sections 18 for the four modules extend substantially completely around the vehicle. Each of the modules 14 includes a rotating blade section as described in application Ser. No. 08/883,031 for driving fluid from the inlet through a rear outlet 20 to provide thrust for moving the vehicle. The rotating blade section may be driven by a rim drive electric motor in the manner described in U.S. Pat. No. 5,967,749, the disclosure of which is incorporated herein by reference and may include stationery vanes following the rotating blade section to straighten the flow of fluid driven by the rotating blade section.

In the illustrated embodiment, four modules 14 are symmetrically disposed about the axis 22 of the vehicle to provide thrust which is uniformly distributed around the vehicle axis, and control vanes 24 are mounted on the module housing 16 at locations between the modules 14 so that they do not interfere with the fluid intake to the module and are not affected by the outflow from the module. The propulsion modules 14 are separately operable to facilitate maneuvering of the vehicle. In addition, each module 14 has a separate housing 26 and each module is separately removable from the module housing 16, permitting convenient access and replacement if necessary.

With the disclosed arrangement, an easily maintained, highly maneuverable vehicle is provided with improved survivability and good efficiency. The wraparound design of the propulsion module inlets captures the boundary layer from the vehicle's hull to the maximum extent possible. Moreover, the propulsion modules are completely external to the ship's hull, thus eliminating the need for shafting extending through the hull and eliminating the survivability issue associated with a failed shaft seal. The bladed sections of the propulsion modules are completely enclosed, thus allowing shallow draft operation or near ground operation without fear of damage to the propulsion blades and the screened inlets prevent the introduction of large submerged foreign materials into the rotating blade rows. Because each propulsion module of the unit can be operated independently, maneuverability of the vehicle is improved.

It will be understood that the number, size and arrangement of the propulsion modules 14 can be varied depending upon the size of the vehicle and the speed and thrust requirements. In addition to maximizing thrust, the arrangement of the invention is capable of optimizing hydrodynamic efficiency.

Although the invention has been described herein with reference to specific embodiments, many modifications and variations therein will readily occur to those skilled in the art. Accordingly, all such variations and modifications are included within the intended scope of the invention.

We claim:

1. A propulsion arrangement for an axisymmetric vehicle comprising a vehicle having a plurality of propulsion modules mounted at the rear of the vehicle and disposed symmetrically about the axis of the vehicle, each propulsion module having a separate internal rotating blade fluid drive section and an inlet section at the forward end of the module arranged to draw in the boundary layer extending along the surface of the hull and supply fluid substantially uniformly to the bladed section so that the combined inlet sections extend substantially completely around the hull of the vehicle, each propulsion module also having a separate rear outlet for fluid to provide thrust for moving the vehicle, the rear outlets being symmetrically disposed about the axis of the vehicle.

2. A propulsion arrangement according to claim 1 wherein each of the propulsion modules includes a stationary vane section following the rotating blade section.

3. A propulsion arrangement according to claim 1 including a plurality of control vanes for the vessel located between adjacent pairs of propulsion modules.

4. A propulsion arrangement according to claim 1 wherein each inlet section is screened to prevent ingestion of large objects into the rotating blade section.

5. A propulsion arrangement according to claim 1 wherein the plurality of propulsion modules comprises four modules.

6. A propulsion arrangement according to claim 1 including a rim drive electric motor for the rotating blade section of each of the propulsion modules.

* * * * *